US008634998B2

(12) United States Patent
Kuras et al.

(10) Patent No.: US 8,634,998 B2
(45) Date of Patent: Jan. 21, 2014

(54) CONTINUOUSLY VARIABLE TRANSMISSION CLUTCH ANTI-AUTOENGAGEMENT IN MULTI-CLUTCH VEHICLE TRANSMISSION ARRANGEMENT

(75) Inventors: Brian D. Kuras, East Peoria, IL (US); Brian E. Lister, Edwards, IL (US); Glen Patrick Calvert, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 65 days.

(21) Appl. No.: 13/430,260

(22) Filed: Mar. 26, 2012

(65) Prior Publication Data
US 2013/0253790 A1    Sep. 26, 2013

(51) Int. Cl.
*B60K 23/02*    (2006.01)

(52) U.S. Cl.
USPC ............................................. 701/67; 701/68

(58) Field of Classification Search
USPC ....................................................... 701/67, 68
See application file for complete search history.

(56) References Cited

U.S. PATENT DOCUMENTS

| 6,536,569 | B2 | 3/2003 | Nishimura | |
|---|---|---|---|---|
| 6,676,562 | B1 | 1/2004 | Bulgrien | |
| 8,321,108 | B2 * | 11/2012 | Tona et al. | 701/68 |
| 2010/0010718 | A1 * | 1/2010 | Tona et al. | 701/68 |

FOREIGN PATENT DOCUMENTS

WO    WO 03104015 A1 * 12/2003

* cited by examiner

*Primary Examiner* — Mary Cheung
*Assistant Examiner* — Michael Berns
(74) *Attorney, Agent, or Firm* — Leydig, Voit & Mayer

(57) ABSTRACT

A machine is described that includes an engine, a multi-clutch transmission and a controller. The controller is configured with computer-executable instructions for managing operation of the multi-clutch transmission to avoid autoengagement of a disengaged clutch. The computer-executable instructions configure the controller to receive sensor signals indicative of current operating status of the machine; determine, based upon the sensor signals, a configured minimum engine speed needed to avoid autoengagement of the disengaged clutch; and conditionally increase an engine speed based upon a comparison of the configured minimum engine speed and a sensed current engine speed. The machine includes a continuously variable transmission coupled to the multi-clutch transmission, and the controller is configured to adjust the continuously variable transmission ratio to counter the engine speed increase and thus maintain a current clutch output speed when increasing the engine speed to avoid autoengagement of a disengaged clutch.

23 Claims, 6 Drawing Sheets

CONTINUOUSLY VARIABLE TRANSMISSION CLUTCH ANTI-AUTOENGAGEMENT IN MULTI-CLUTCH VEHICLE TRANSMISSION ARRANGEMENT

TECHNICAL FIELD

This patent disclosure relates generally to multi-clutch transmission assemblies in motorized vehicles, and more particularly relates to controlling the relative operating parameters of rotating engine speed and rotating linkages to the multi-clutch transmission using a ratio of a transmission to avoid autoengagement of a disengaged clutch while a second one of the multiple clutches is engaged.

BACKGROUND

A variety of transmission arrangements exists to meet differing needs of various motorized vehicle types. Manual transmissions generally require drivers to manually disengage the transmission from an engine's rotating drive shaft by depressing a clutch pedal. When a driver depresses the clutch pedal, the engine's rotational drive force is disengaged from a gear set contained in the transmission. Thereafter, a driver manually selects a new gear using a stick shift. The driver releases the clutch pedal to reengage the transmission with the engine's drive force.

Automatic transmissions carry out the gear shifting and clutch manipulation work for drivers in response to detected conditions, including torque demand and engine speed. An automatic transmission uses, for example, clutches, a torque converter and planetary gears to control transferring rotational force from an engine to an output (e.g., a set of drive wheels on a vehicle). Automatic transmissions typically comprise a planetary gear set and multiple clutches used to control the relative rotation of the planetary gears set's ring, planet and sun gears, and a planet carrier relative to one another. Moreover, complex automatic transmissions include multiple planetary gear sets connected in series with one another to provide a wider range of gear ratios. In such transmissions, an output component of a first planetary gear set (e.g., a ring gear) is permanently fixed to an input component of a second planetary gear set (e.g., a planet carrier). The combination of engaged/disengaged clutches determines the effective gear ratio of the automatic transmission.

The above transmission arrangement including multiple clutches, with some clutches being disengaged to achieve a particular effective gear ratio, presents a possibility that one or more of the disengaged clutches will not stay or remain sufficiently disengaged during operation in a given state. This state is referred to herein as "autoengaged."

The failure of a clutch to stay disengaged fully leads to sub-optimal operation of the transmission. The non-optimal operation includes one or more undesirable characteristics. Such undesirable characteristics include: excess heating of the transmission, frictional dragging of the clutch pads causing degraded transmission efficiency and excess fuel usage, generation of excessive heating by the rubbing of the autoengaged clutch pads, and premature/sudden breakdown of clutch components due to excessive heating and/or rubbing of pad/gear components upon one another.

This and other shortcomings in the state of the art are addressed by aspects of an exemplary method and transmission assembly (including a controller thereof) described herein.

SUMMARY OF THE INVENTION

The disclosure describes, in one aspect, a method of managing operation of a machine having a multi-clutch transmission to avoid autoengagement of a disengaged clutch. A controller on the machine receives sensor signals indicative of current operating status of the machine. Thereafter, the controller determines, based upon the sensor signals, a configured minimum engine speed needed to avoid autoengagement of the disengaged clutch. The engine speed is then conditionally increased based upon a comparison of the configured minimum engine speed and a sensed current engine speed. In another aspect, a non-transitory computer readable medium comprises computer-executable instructions for configuring a controller for a machine to perform the above-summarized method. In a particular implementation, the method further includes adjusting a continuously variable transmission ratio to counter the engine speed increase, thereby maintaining a current clutch output speed when increasing the engine speed.

In yet another aspect, a machine is described that incorporates the functionality of the above-described method. The machine includes an engine, a multi-clutch transmission and a controller. The controller is configured with computer-executable instructions for managing operation of the multi-clutch transmission to avoid autoengagement of a disengaged clutch. The computer-executable instructions configure the controller to receive sensor signals indicative of current operating status of the machine; determine, based upon the sensor signals, a configured minimum engine speed needed to avoid autoengagement of the disengaged clutch; and conditionally increase an engine speed based upon a comparison of the configured minimum engine speed and a sensed current engine speed. In a particular example, the machine includes a continuously variable transmission coupled to the multi-clutch transmission, and the controller is configured to adjust the continuously variable transmission ratio to counter the engine speed increase, thereby maintaining a current clutch output speed when increasing the engine speed to avoid autoengagement of a disengaged clutch.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Before describing illustrative examples it is noted that, as used herein, the term "transmission" generally refers to a portion of a motorized device that adjustably (via shifting) transmits power from an engine or motor to a driven axle. By selecting a particular gear (or ratio in the case of a continuously variable transmission), the transmission controls the speed and torque relationships between the engine output and the driven axle of the transmission. A common use of a transmission is to control the torque and speed relationship between output of an engine/motor and drive wheels of a vehicle.

This disclosure relates to systems and methods for managing clutch components in a multi-clutch transmission assembly for a motorized drive system exhibiting large ranges of torque and speed at the output of the transmission (e.g., driven axle). Such operational characteristics meet the wide ranges of torque demand and speed requirements arising from operating heavy machinery including, for example, off-road trucks and wheel loaders.

Figure 1A:
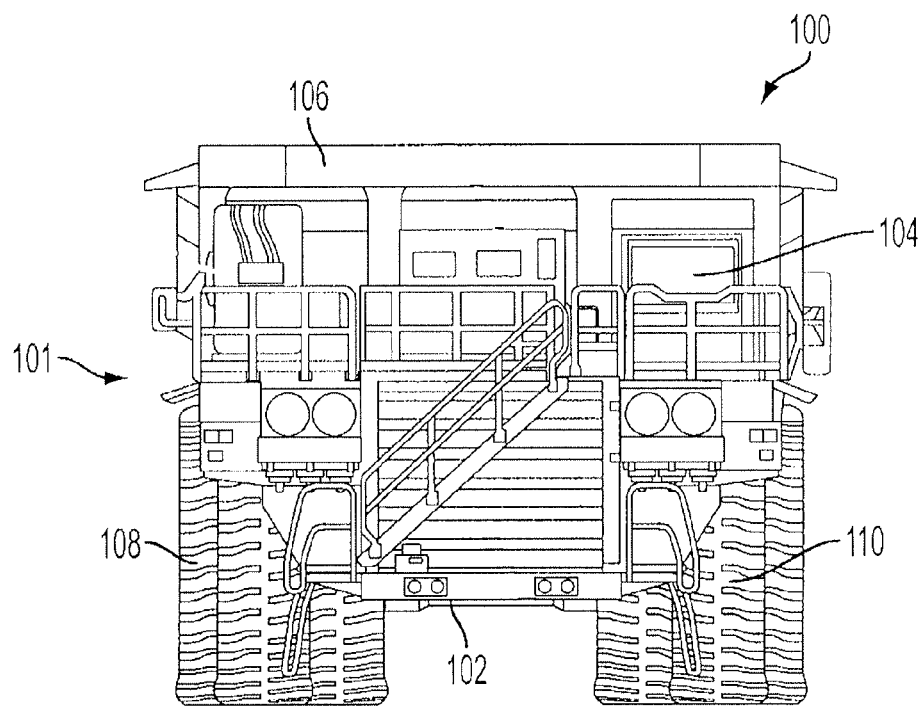
FIGS. 1A and 1B are, respectively, a front view and a side view of an exemplary vehicle/machine suitable for incorporating a multi-clutch transmission including a CVT in accordance with the disclosure.
Figure 1B:
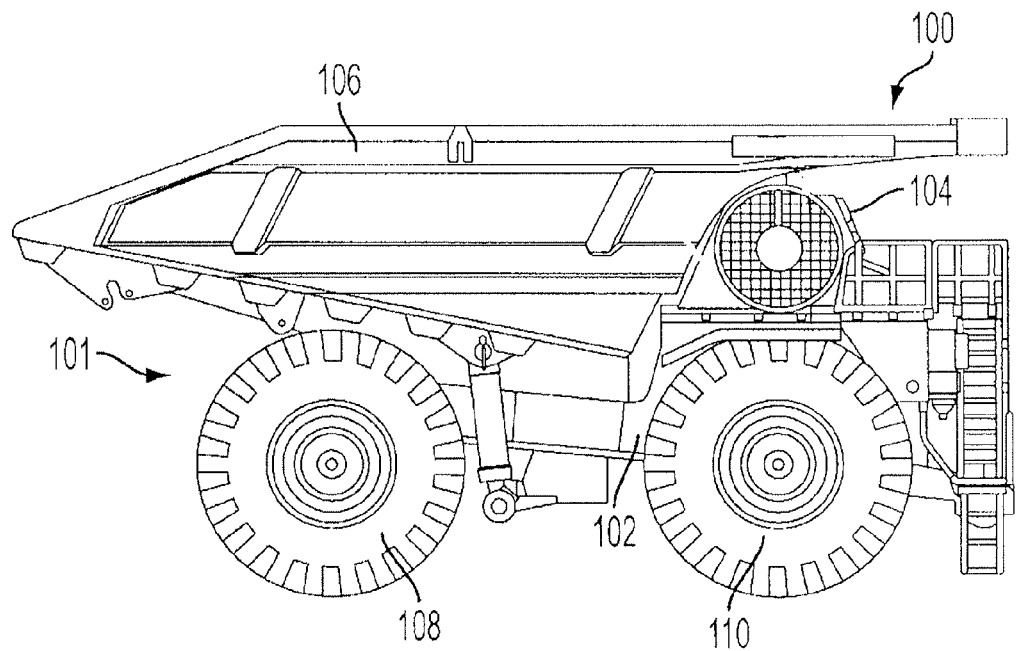

FIG. 1A and FIG. 1B illustrate, respectively, a front and a side view of a machine 100. The off-highway truck 101 has a wheel drive system including a multi-clutch transmission providing a wide range of output torque at desired engine speeds enabling the off-highway truck 101 to drive on a variety of sloped surfaces having various grades while carrying potentially very heavy loads. The off-highway truck 101 is an illustrative example of a suitable engine/motor driven apparatus incorporating a control arrangement for avoiding autoengagement of a disengaged clutch in a multi-clutch transmission. As can be appreciated, other apparatuses having a multi-clutch transmission potentially benefit from the control arrangement described herein. Thus, the term "machine" generically refers to a wide variety of apparatuses that are capable of incorporating an engine/motor and multi-clutch transmission such as the ones described, by way of example, herein.

Referring to FIGS. 1A and 1B, a front view and a side view are provided of the off-highway truck 101. The off-highway truck 101 includes a chassis 102 that supports an operator cab 104 and a bucket 106. The bucket 106 is pivotally connected to the chassis 102 and is arranged to carry a potentially very heavy payload when the off-highway truck 101 is in service. An operator occupying the operator cab 104 controls the motion and the various functions of the off-highway truck 101. The chassis 102 supports various drive system components. These drive system components drive a set of drive wheels 108 to propel the off-highway truck 101 over a range of sloped surfaces. A set of idle wheels 110 steer the vehicle such that the off-highway truck 101 can be steered in any direction. Even though the off-highway truck 101 is depicted in the illustrative example, one can appreciate that other machine configurations, such as a wheel loader, tractor, motor grader, etc. incorporate a multi-clutch transmission and can thus benefit from incorporating the control arrangement described herein to avoid autoengagement of a disengaged clutch of the multiple clutches during operation.

Figure 2:
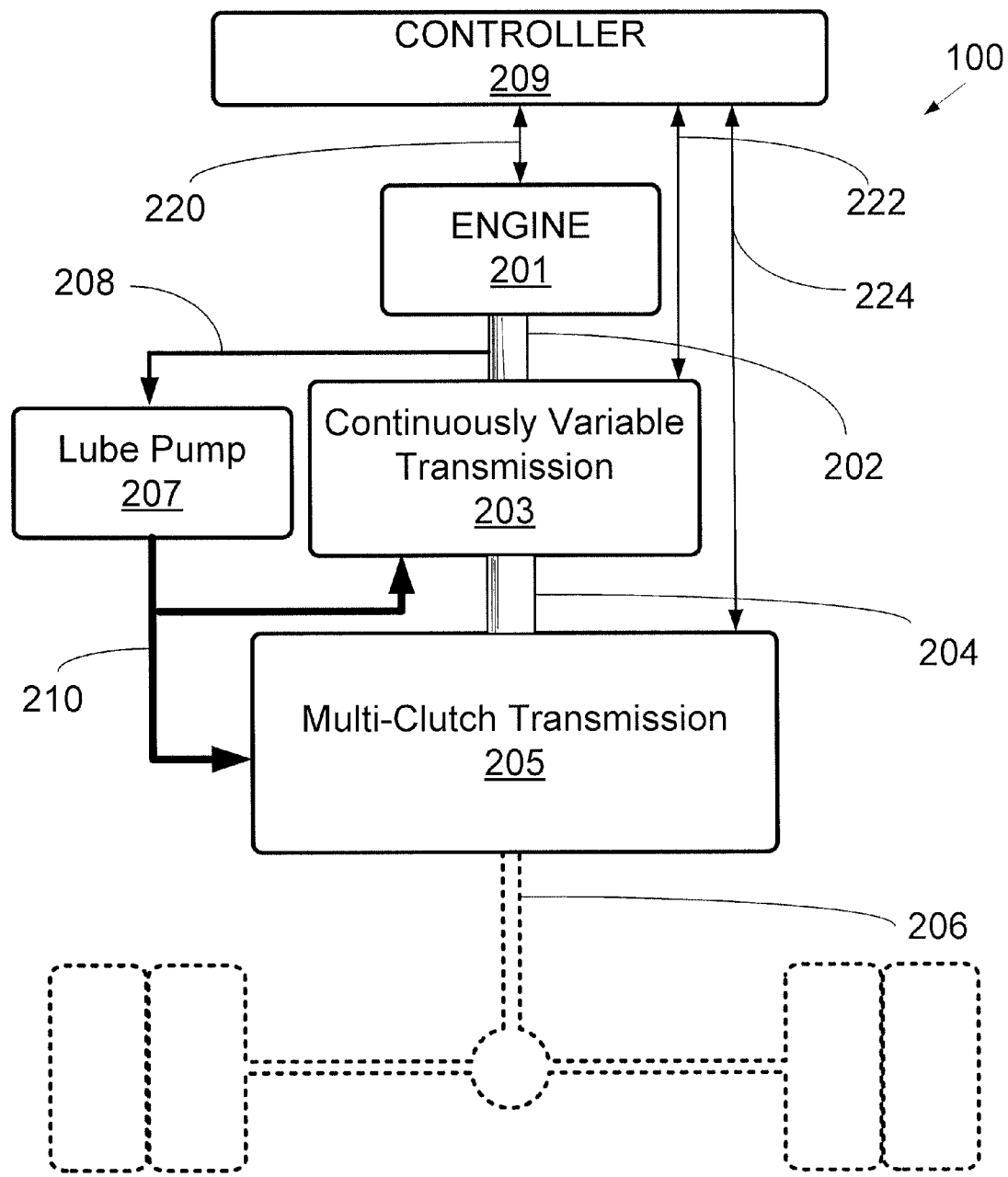
FIG. 2 is a block diagram representation of the engine, lube pump, multi-clutch transmission and controller of an exemplary machine 100 in accordance with the disclosure.

Turning to FIG. 2, the machine 100, such as the off-highway truck 101, has an engine 201, a continuously variable transmission (CVT) 203, and a multi-clutch transmission 205 controlled by a controller 209. The CVT 203 and multi-clutch transmission 205 can be, and typically are, combined into one transmission assembly package. This combination can have a plurality of arrangements that are common with CVTs and CVT technology.

The engine 201 is, for example, an internal combustion engine such as a diesel engine. However, in alternative embodiments and electric motor or even a combination of internal combustion engine and electric motor (hybrid) drive are used. In the illustrative example, the engine 201 produces an output torque at an engine output shaft 202. The engine output shaft 202 is, in turn, connected to an input of the CVT 203. Variators, such as a hydraulic pump and motor (e.g., variable displacement axial piston type) or electric generator and motor, within the CVT 203 are controlled by the controller 209 to produce a variable range of ratios between the rotational speed of the engine output shaft 202 (CVT input) and the rotational speed of a CVT output shaft 204 (CVT output). A defining characteristic of the CVT is that the ratio of the rotational speeds of the CVT input and CVT output can be varied continuously within a specified range. Thus the range ratios in a CVT, in contrast to a transmission having discrete gears (e.g., the multi-clutch transmission 205), is permitted to vary essentially anywhere within a minimum and maximum ratio.

The CVT output shaft 204 is connected to an input of the multi-clutch transmission 205. Multi-clutch transmissions, such as the multi-clutch transmission 205, are well known and will not be described in detail herein. An illustrative example of the multi-clutch transmission 205 includes a compound planetary gear arrangement wherein two planetary gears are connected in series to one another (e.g., a ring gear of an input gear set is permanently coupled to a planet carrier of an output gear set of a compound planetary gear structure). In such arrangement, one or more of the multiple clutches are selectively engaged, under direction by the controller 209, to one or more components of a planetary gear assembly (i.e., a ring gear, planet gear, planet carrier, and sun gear) to achieve a desired one of a finite number of gears (including reverse) supported by the multi-clutch transmission 205. Ideally, the other clutches remain disengaged.

Thus, in operation, the engine output shaft 202 rotates the input to the CVT 203 to produce rotation, at a controlled rate/torque on the CVT output shaft 204. The CVT output shaft 204, in turn provides a rotational force on the input to the multi-clutch transmission 205. Multi-clutch transmission 205 provides a torque force on a drive shaft 206 connected to drive wheels of the machine 100. The torque and rotational speed of the drive shaft 206, in relationship to torque and speed of the CVT output shaft 204, is determined by selecting an operating gear which engages particular ones of the clutches of the multi-clutch transmission 205. FIG. 2 also includes sensor/control lines 220, 222 and 224, described further herein below with reference to FIG. 5, that facilitate control of the engine 201, CVT 203 and multi-clutch transmission 205 to prevent autoengagement of disengaged clutches of the multi-clutch transmission 205 in accordance with an illustrative control scheme described herein below with reference to FIG. 6.

The machine 100 also includes a lube pump 207 that provides an output lube pressure (via lube pressure line 210) to disengaged clutches within the multi-clutch transmission 205 to maintain their disengaged state. A control line 208 (electrical or physical) graphically depicts a (generally proportional) relationship between the rotational speed of the engine output shaft 202 and the lube pressure generated by the lube pump 207 via lube pressure line 210 to the clutches of the multi-clutch transmission 205.

Figure 3:
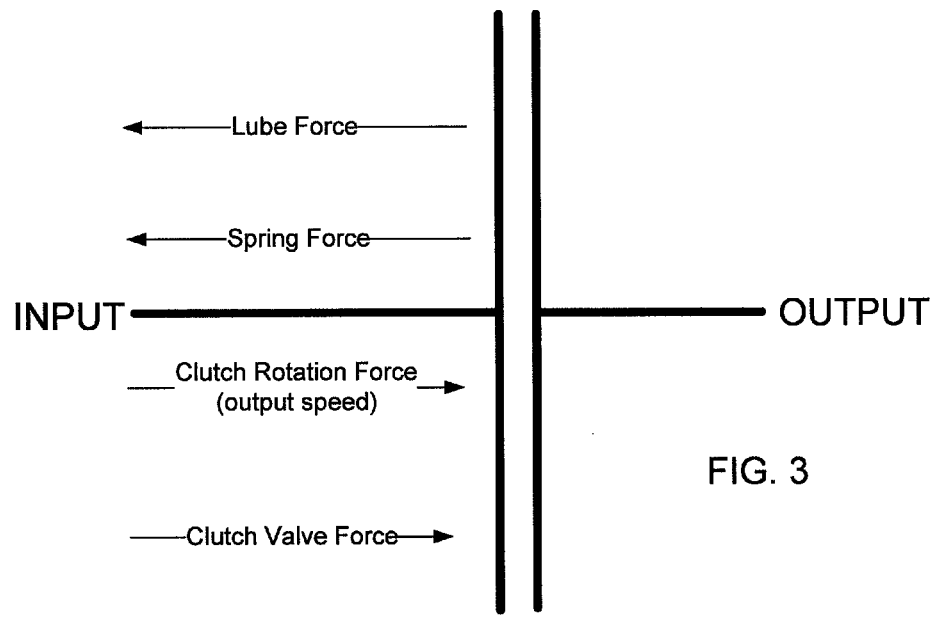
FIG. 3 is a schematic diagram depicting a set of four (4) forces that generally operate upon a clutch to influence the state of engagement of the clutch in relationship to a corresponding gear component of a planetary gear assembly.
Figure 4:
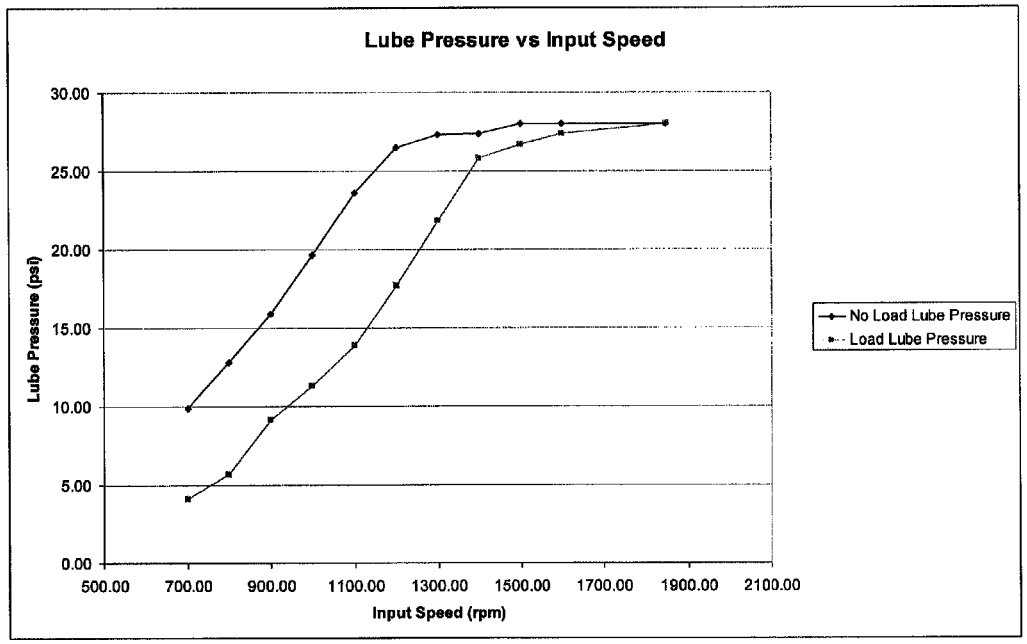
FIG. 4 is a chart depicting an illustrative relationship between lube pressure (generated by a lube pump controlled by engine speed) and engine (input) speed.

Turning briefly to FIG. 3, four (4) distinct forces are identified that contribute to determining the pressure, if any, applied by a clutch to a corresponding engaging surface of a planetary gear assembly component of the multi-clutch transmission. The forces represented in FIG. 3 include two disengaging forces tending to pull the clutch away from the engaging surface. A lube force, provided by a balance piston, applies a disengaging force to the clutch. As shown in FIG. 4, lube force generated by the lube pump 207 increases (under both load and no load conditions) as engine speed (as measured on engine output shaft 202) increases since pressure generated by the lube pump 207 is driven according to the engine output shaft 202 rotation speed. To a lesser extent, lube pressure is also a function of charge flow demand (e.g., CVT variator flushing). Yet another contributor to lube pressure is the lube oil temperature (typically as oil temperature increases, lube pressure decreases). In addition, typically when the transmission is under load, other components (like the variator) demand increase lube flow and thus the resultant lube pressure decreases. A spring force applies a disengaging force to the clutch. The spring force characteristic (i.e., spring coefficient) is generally static (simply a function of displacement and spring coefficient) and generally produces a force on the clutch to a disengaged position.

Two engaging forces are depicted in FIG. 3 that tend to push the clutch pad toward the engaging surface. A clutch valve force is applied when the controller 209 issues a control command for causing one of the clutches to engage a corresponding planetary gear assembly component. A clutch rotational force is an unintended, undesirable force tending to cause the clutch to engage the corresponding planetary gear assembly in the absence of the clutch valve force. The clutch rotational force generally increases with increases in the rotational output speed of the output of the multi-clutch transmission 205 connected to the drive shaft 206 of the machine 100.

Under ideal circumstances, when one of the clutches is disengaged in the multi-clutch transmission 205, pressure applied by the clutch pad(s) is sufficiently withdrawn from a corresponding planetary gear assembly component to prevent a frictional (i.e., slipping) engagement between the clutch and corresponding gear. However, the clutch rotational force increases with an increase in the clutch rotation speed (proportional to the drive axle speed). Therefore, the increased clutch rotational force if not countered, may eventually lead to autoengagement (a slipping relationship) of a disengaged clutch and a corresponding planetary gear component. Autoengagement of the disengaged clutch creates a countering force to the driving force of the engine and reduces torque delivered to the drive shaft 206. Moreover, the excessive heating arising from frictional rubbing between the autoengaged (slipping) clutch and the corresponding planetary gear component causes premature wear and breakdown of the transmission components. A method, carried out by the machine 100 including the engine 201, the continuously variable transmission (CVT) 203, the multi-clutch transmission 205 and the controller 209, is described herein below that prevents damage to multi-clutch transmission components arising from the aforementioned autoengagement of a disengaged clutch. In general, the controller 209 senses conditions where autoengagement is occurring or may occur and boosts the engine speed (thus increasing the lube pump 207 pressure/force) while maintaining a constant clutch rotation speed by adjusting the CVT 203 ratio. Maintaining a constant output speed is desirable by an operator.

Figure 5:
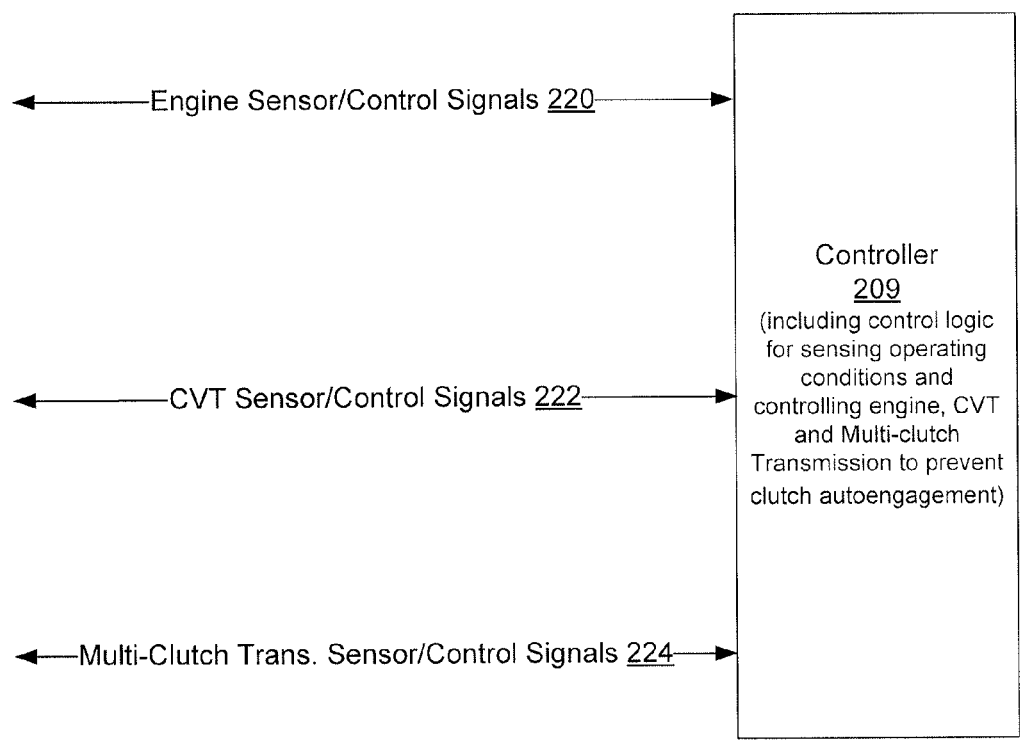
FIG. 5 is a schematic diagram depicting the signals received/transmitted by an illustrative controller for a machine in accordance with the disclosure.

A block diagram for the controller 209 for use in the machine 100 having the CVT 203 and multi-clutch transmission 205 is shown in FIG. 5. The controller 209 is a single controller integrated circuit package or alternatively includes multiple physical circuit packages communicatively coupled together to facilitate their coordinated operation to carry out the control operations described herein to prevent clutch autoengagement. For example, a master controller, used to control the overall operation and function of the machine, is cooperatively implemented with a motor or engine controller, used to control the engine 201. Thus, the term "controller" is potentially one, two, or more controllers that monitor and govern operation of various controllable elements of the machine 100 and that may cooperate in controlling various functions and operations of the machine 100. The functionality of the controller, while shown conceptually in FIG. 5 to include various inputs and outputs for carrying out control of the engine 201, CVT 203 and multi-clutch transmission 205, is implemented in hardware and/or software without regard to the discrete functionality shown. Accordingly, various interfaces of the controller 209 are described relative to components of the system shown in the block diagram of FIG. 2. Such interfaces do not limit the type and number of components that are connected, or the number of controllers.

It will be appreciated that the controller 209 discussed herein is a computing device, e.g., a processor, which reads computer-executable instructions from a computer-readable medium and executes those instructions. Media that are readable by a computer include both non-transitory and transitory media. Examples of the former include magnetic discs, optical discs, flash memory, RAM, ROM, tapes, cards, etc. Examples of the latter include acoustic signals, electrical signals, AM and FM waves, etc. As used in the appended claims, the term "non-transitory computer-readable medium" denotes tangible media that are readable by a computer unless otherwise specifically noted in the claim.

In FIG. 5, the controller 209 is disposed to receive and send a variety of sensor and control signals via sensor/control lines 220, 222 and 224 from/to the engine 201, CVT 203 and the multi-clutch transmission 205. The controller 209 receives, via the engine sensor/control lines 220, an engine speed (e.g., revolutions per minute) signal. The engine speed signal is indicative of the lube pressure generated by the lube pump 207. Based upon additional sensed conditions (described herein), the controller 209 issues signals via sensor/control lines 220 to the engine 201 to modify the desired/actual engine speed to avoid clutch autoengagement.

The controller 209 receives, via the CVT sensor/control lines 222, signals indicative of the current state of operation of the CVT 203. Such signals include a current position of a variator defining the input/output ratio of the CVT 203. The controller 209 issues signals via the CVT sensor/control lines 222 to modify the desired/actual input/output ratio. With regard to an exemplary scheme for preventing clutch autoengagement, the controller 209 issues commands via the CVT sensor/control lines 222 to the CVT 203 causing a change in the CVT ratio when the engine speed is increased to maintain a steady speed on the CVT output shaft 204 (the input to the multi-clutch transmission 205).

The controller 209 receives, via the multi-clutch transmission sensor/control lines 224, signals indicative of the current state of operation of the multi-clutch transmission 205. Such signals include an output speed of one or more clutches of the multi-clutch transmission. In an illustrative example, the output speed of a clutch is calculated indirectly from a sensed rotational speed of the drive axle 206 since the proportional relationships between each rotating clutch and the drive axle 206 are known. This enables computation of the output speed of each one of the multiple clutches using a single sensor. In an illustrative example, the controller 209 receives signals indicative of current lube oil pressure. If lube pressure is not available, the controller 209 also receives signals indicative of current lube oil temperature and whether variator flushing is on (reducing the lube pressure provided by the lube pump 207 to the multi-clutch transmission 205). Moreover, a further signal provides a temperature sensor signal indicative of the temperature of the multi-clutch transmission 205. Other potential sensor signals provided in other arrangements include sensor signals indicative of the temperatures of individual clutches.

The operation of the machine 100, including the controller 209, in a manner to avoid autoengagement of a disengaged clutch is summarized herein below with reference to FIG. 6. However, prior to operation, the controller 209 is configured with a mapping (point-by-point graph, a characterizing equation, etc.) function that relates a sensed clutch output speed (e.g., speed of the drive axle 206) and a desired minimum engine speed (higher engine speeds being allowed). The relationship between clutch output speed and engine speed (for avoiding autoengagement) is driven by the need to maintain sufficient lube pressure (provided by lube pump 207) to counter clutch rotational force at a sensed clutch rotational output speed to avoid autoengagement of the disengaged clutch(es). Such relationship is established by operating the machine 100 (or a representative model of the machine 100) to determine a set of actual/predicted engine speeds at which autoengagement occurs for a given sensed clutch output speed. Since lube pressure is the actual force of interest (as opposed to engine speed which relates to the lube pressure) for preventing autoengagement, illustrative examples of the control scheme described herein take into consideration other sensed conditions having a significant impact upon lube pressure, including both lube oil temperature, lube oil viscosity rating, and variator flushing state (on/off). In addition, lube pressure is directly measured for use in the control software. Once the minimum engine speed point is established (e.g., 200 rpm above the autoengagement engine speed) for the operational range of clutch output speeds, the set of minimum engine speeds are stored in memory accessible to the controller 209). Such relationship is illustratively depicted in the graph provided in FIG. 7.

Figure 6:
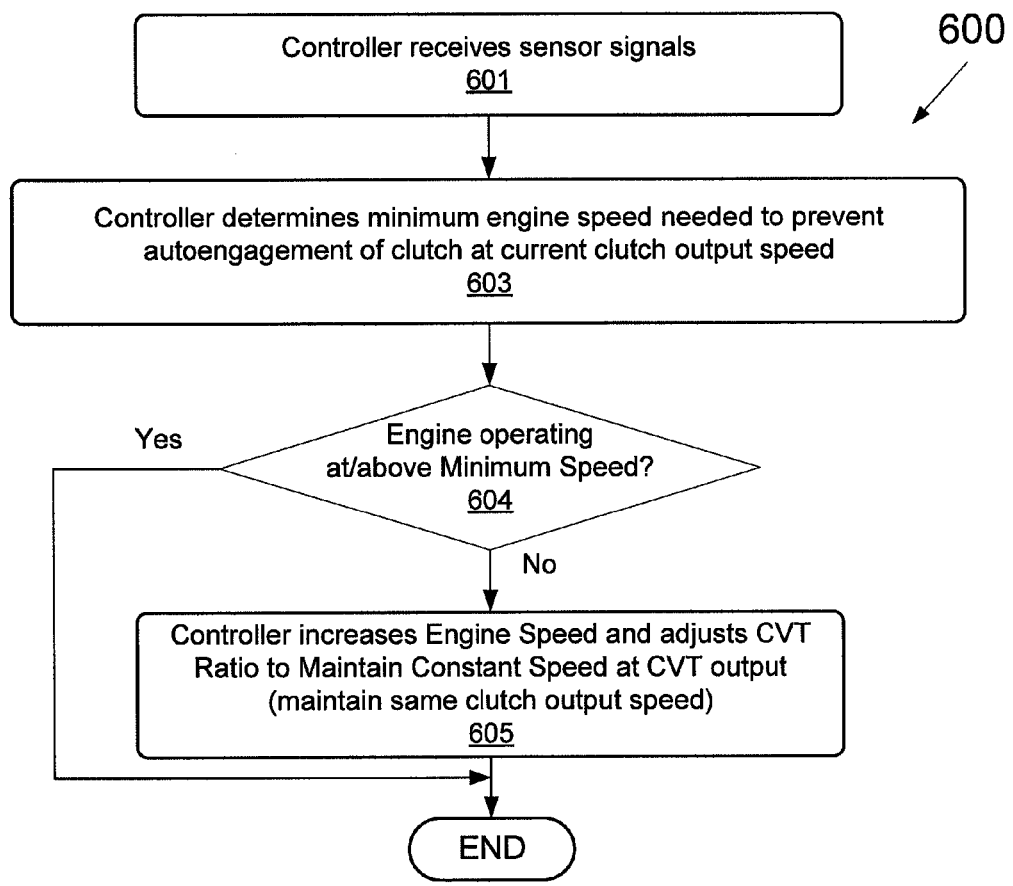
FIG. 6 is a flowchart summarizing the operation of an exemplary process carried out by a controller in accordance with the disclosure.
Figure 7:
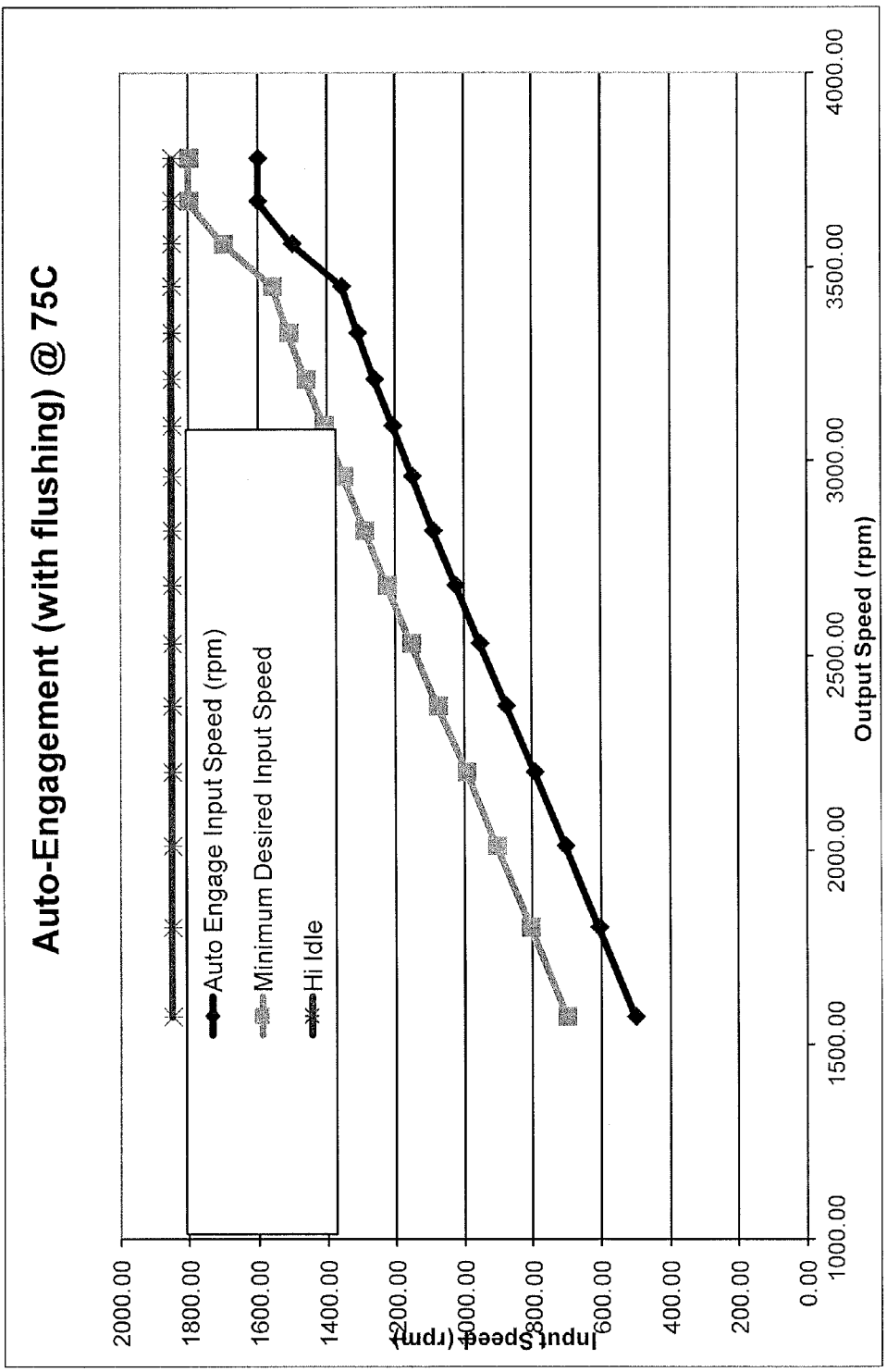
FIG. 7 is a chart depicting an illustrative relationship between clutch output speed and engine speeds at which autoengagement occurs, or is avoided, in accordance with the disclosure.

FIG. 6 depicts a set of steps for a process 600 carried out under the direction of the controller 209, using the characterizing relationship depicted in FIG. 7, to regulate and coordinate operation of the engine 201, the CVT 203, and the multi-clutch transmission 205 to prevent autoengagement of a disengaged clutch in the multi-clutch transmission 205. The process 600 is exemplary. Thus, variations are contemplated for controlling the machine 100 to prevent autoengagement of a disengaged clutch of the multi-clutch transmission by ensuring the engine 201 operates at sufficient speed while maintaining a constant output speed of rotational clutch outputs.

During step 601 of the process 600, the controller 209 receives sensor signals indicative of the current operating condition of the machine via lines 220, 222, and 224 (described herein above). Such signals include, by way of example, engine speed ("input speed" in FIG. 7), clutch output speed (e.g., drive axle 206 speed), lube pressure, lube oil temperature, variator flushing state (on/off), etc. Other potentially used signals include a signal indicating whether one of the clutches is currently disengaged, and which one(s) of the multiple clutches is disengaged.

Thereafter, at step 603 the controller 209 references the mapping between clutch output speed and minimum engine speed. In a simplest case, the relationship is based solely upon sensed engine speed and clutch output speed. However, other exemplary schemes also consider the effect of actual lube pressure, lube oil temperature, variator flushing, and oil viscosity rating to establish the minimum engine speed for a provided clutch output speed.

Next, at step 604, if the engine is operating at or above the specified minimum speed for the current clutch output, then control passes to the End. The process depicted in FIG. 6 will wait for a designated period (or the sensing of another configured event such as a sufficient change in either the engine speed or clutch output speed) before repeating the summarized steps.

It is further noted that when the transmission is in neutral, the clutches of the multi-clutch transmission are disengaged. The potential for autoengagement remains since the multi-clutch transmission is still connected to the drive axle 206. Thus, the engine speed must be maintained at a specified level to ensure sufficient lube pressure to prevent autoengagement of a disengaged clutch. However, while the transmission is in neutral, the CVT is disconnected from the drive axle via the clutches, and therefore it is not necessary to adjust the CVT ratio (since the CVT output has no effect on the vehicle speed while in neutral) to counter engine speed adjustment.

If, at step 604, the engine is below the specified minimum speed, then control passes to step 605. At step 605 steps are taken to prevent (or exit) an autoengaged state of the clutch. Such effect is achieved, in the illustrative example by increasing the engine 201 speed to at least the specified minimum speed and adjusting the CVT 203 ratio proportionally to the engine speed increase such that the net effect is an unchanged speed at the output of the CVT 203. Control then passes to the End.

The illustrative control process described herein above with reference to FIG. 6 can be modified and/or enhanced through use of additional and/or alternative sensors. For example, rather than modeling the machine 100's operation, the mapping depicted in FIG. 7 is established by an adaptive calibration procedure, by sensing autoengagement during a breaking in period of operation of the machine 100. During the breaking in period, the machine 100 permits autoengagement to occur. The autoengagement is sensed in any of a variety of manners including, for example, sensing a temperature of the transmission assembly containing the autoengaged clutch and/or sensing a reduction in output torque from the transmission assembly. The engine speed and clutch output speed are noted at which autoengagement occurred. Other potentially noted sensors include, for example, lube oil temperature, variator flushing state, lube pressure, etc. The controller 209 stores the sensed conditions at which autoengagement and configures an engine speed (increase) at which the engine will be operated in the future to avoid/prevent autoengagement. Such configuration is performed potentially multiple times to account for various factors influencing any of the forces depicted in FIG. 3 that affect autoengagement of a clutch in the multi-clutch transmission 205. Moreover, when the machine 100 is serviced (e.g., new lube oil, new clutches, springs, etc.) or operated in a substantially different climate (e.g., arctic) such that the autoengagement conditions are likely changed, the machine 100 recalibrates the engine speeds for given clutch output speeds for avoiding autoengagement of a disengaged clutch.

INDUSTRIAL APPLICABILITY

The present disclosure is applicable to driven machines having multi-clutch transmissions for imparting motion to the machine. In particular, the disclosed principles provide a mechanism for preventing autoengagement of a disengaged one of the multiple clutches of the transmission that reduces operational efficiency and leads to premature breakdown of transmission parts. This system may be implemented in off-highway machines including dump trucks and wheel loaders. Although many machines that may benefit from the disclosed principles will be machines used in off-road machines, it will be appreciated that the disclosed machines and controller process for such machines are used in other contexts as well, and the disclosed teachings are likewise broadly applicable.

Using the disclosed principles, a controller 209 prevents autoengagement of a disengaged clutch within the multi-clutch transmission 205 by increasing the engine 201 speed and adjusting the CVT 203 ratio to maintain a constant output speed at the clutch output of the multi-clutch transmission 205. It will be appreciated that this description provides examples of the disclosed system and technique. However, it is contemplated that other implementations of the disclosure may differ in detail from the foregoing examples. Moreover, the references to examples herein are intended to reference the particular example being discussed at that point and are not intended to imply any limitation as to the scope of the disclosure more generally. All language of distinction and disparagement with respect to various features is intended to indicate a lack of preference for those features, but not to exclude such from the scope of the disclosure entirely unless otherwise indicated. Although the engine 201 is typically an internal combustion engine, other engines/motors are contemplated for use in the machine 100 without departing from the scope of the disclosed principles.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order and from any suitable step unless otherwise indicated herein or otherwise clearly contradicted by context.

In general, the problem of autoengagement is not limited to the transmission assembly depicted in FIG. 2 (including a CVT positioned before a multi-clutch transmission in a drive train). In particular, autoengagement of a disengaged clutch potentially arising with a multi-clutch transmission alone (i.e., no CVT in the transmission assembly). In such case, autoengagement is avoided by changing gears (to a lower gear) and adjusting the desired/actual engine speed to maintain sufficient lube oil pressure to counter a rotational pressure exerted on a disengaged clutch to prevent autoengagement. However, a standard transmission only supports a limited set of ratios to keep the output speed constant. Therefore a range chosen to force engine speed higher than the autoengagement point while keeping output speed constant. This use of downshifting of a multi-clutch transmission to accomplish the goal of avoiding autoengagement of a disengaged clutch. However, the engine will be operating at less than optimal efficiency (i.e., a higher RPM than normally needed to operate the vehicle at a current speed) when operating in a mode that prevents autoengagement.

What is claimed is:

1. A method of managing operation of a machine having a multi-clutch transmission to avoid autoengagement of a disengaged clutch, the method comprising:
   receiving, by a controller, sensor signals indicative of current operating status of the machine;
   determining, by the controller, based upon the sensor signals, a configured minimum engine speed needed to avoid autoengagement of the disengaged clutch; and
   conditionally increasing an engine speed based upon a comparison of the configured minimum engine speed and a sensed current engine speed.

2. The method of claim 1, further comprising the step of:
   establishing the configured minimum engine speed by modeling, on the machine, operation of at least: a lube pump and the disengaged clutch.

3. The method of claim 2 wherein the modeling incorporates a lube oil temperature.

4. The method of claim 2 wherein the modeling incorporates a variator flushing state.

5. The method of claim 1, further comprising the step of:
   establishing the configured minimum engine speed by monitoring operation of the machine for an actual autoengagement.

6. The method of claim 5, wherein during the establishing step, the controller registers a current engine speed and a clutch output speed when the actual autoengagement is sensed.

7. The method of claim 1 wherein the configured minimum engine speed relates to a needed lube pressure from a lube pump driven by the engine.

8. The method of claim 1, wherein one of the sensor signals is a clutch output speed.

9. The method of claim 8 wherein one of the sensor signals is a current engine speed.

10. The method of claim 1, further comprising adjusting a continuously variable transmission ratio to counter the engine speed increase, thereby maintaining a current clutch output speed when increasing the engine speed.

11. A non-transitory computer readable medium including computer executable instructions for managing operation of a machine having a multi-clutch transmission to avoid autoengagement of a disengaged clutch, the computer-executable instructions configuring a controller of a machine to perform the steps of:
    receiving, by the controller, sensor signals indicative of current operating status of the machine;
    determining, by the controller, based upon the sensor signals, a configured minimum engine speed needed to avoid autoengagement of the disengaged clutch; and
    conditionally increasing an engine speed based upon a comparison of the configured minimum engine speed and a sensed current engine speed.

12. The non-transitory computer-readable medium of claim 11, further comprising computer-executable instructions for performing the step of:
    establishing the configured minimum engine speed by modeling, on the machine, operation of at least: a lube pump and the disengaged clutch.

13. The non-transitory computer-readable medium of claim 12 wherein the modeling incorporates a lube oil temperature.

14. The non-transitory computer-readable medium of claim 12 wherein the modeling incorporates a variator flushing state.

15. The non-transitory computer-readable medium of claim 11 wherein the configured minimum engine speed relates to a needed lube pressure from a lube pump driven by the engine.

16. The non-transitory computer-readable medium of claim 11, wherein one of the sensor signals is a clutch output speed.

17. The non-transitory computer-readable medium of claim 16 wherein one of the sensor signals is a current engine speed.

18. The non-transitory computer-readable medium of claim 11, further comprising computer-executable instructions for adjusting a continuously variable transmission ratio to counter the engine speed increase, thereby maintaining a current clutch output speed when increasing the engine speed.

19. A machine comprising:
    an engine;
    a multi-clutch transmission; and
    a controller configured with computer-executable instructions for managing operation of the multi-clutch transmission to avoid autoengagement of a disengaged clutch, the computer-executable instructions configuring the controller to perform the steps of:
    receiving, by the controller, sensor signals indicative of current operating status of the machine;
    determining, by the controller, based upon the sensor signals, a configured minimum engine speed needed to avoid autoengagement of the disengaged clutch; and
    conditionally increasing an engine speed based upon a comparison of the configured minimum engine speed and a sensed current engine speed.

20. The machine of claim 19 wherein the configured minimum engine speed relates to a needed lube pressure from a lube pump driven by the engine.

21. The machine of claim 19, wherein one of the sensor signals is a clutch output speed.

22. The machine of claim 21 wherein one of the sensor signals is a current engine speed.

23. The machine of claim 19 further comprising:
    a continuously variable transmission having an output coupled to the multi-clutch transmission input, and
    wherein the controller is further configured with computer-executable instructions for adjusting a continuously variable transmission ratio to counter the engine speed increase, thereby maintaining a current clutch output speed when increasing the engine speed.

* * * * *